United States Patent
Ramachandra et al.

(10) Patent No.: US 9,940,932 B2
(45) Date of Patent: Apr. 10, 2018

(54) SYSTEM AND METHOD FOR SPEECH-TO-TEXT CONVERSION

(71) Applicant: Wipro Limited, Bangalore (IN)

(72) Inventors: Manjunath Ramachandra, Bangalore (IN); Priyanshu Sharma, Bangalore (IN)

(73) Assignee: WIPRO LIMITED (IN)

( * ) Notice: Subject to any disclaimer, the term of this patent is extended or adjusted under 35 U.S.C. 154(b) by 57 days.

(21) Appl. No.: 15/070,827

(22) Filed: Mar. 15, 2016

(65) Prior Publication Data

US 2017/0256262 A1 Sep. 7, 2017

(30) Foreign Application Priority Data

Mar. 2, 2016 (IN) .............................. 201641007269

(51) Int. Cl.
- G10L 15/26 (2006.01)
- G06T 17/20 (2006.01)
- G10L 15/25 (2013.01)
- G10L 15/14 (2006.01)
- G10L 15/187 (2013.01)
- G06F 17/22 (2006.01)

(52) U.S. Cl.
CPC ........ *G10L 15/265* (2013.01); *G06F 17/2288* (2013.01); *G10L 15/14* (2013.01); *G10L 15/187* (2013.01); *G10L 15/25* (2013.01)

(58) Field of Classification Search
CPC .............................. G10L 15/063; G10L 15/30
USPC ....................................................... 704/235
See application file for complete search history.

(56) References Cited

U.S. PATENT DOCUMENTS

| | | | | |
|---|---|---|---|---|
| 6,539,354 B1* | 3/2003 | Sutton | ..................... | G10L 21/06 345/423 |
| 6,654,018 B1* | 11/2003 | Cosatto | ................... | G10L 13/08 345/473 |
| 6,813,607 B1* | 11/2004 | Faruquie | ................ | G10L 21/06 704/258 |
| 7,587,318 B2 | 9/2009 | Seshadri | | |
| 9,190,061 B1* | 11/2015 | Shemer | ................... | G10L 25/78 |
| 2002/0093591 A1* | 7/2002 | Gong et al. | ....... | G06F 17/30029 348/515 |
| 2002/0116197 A1* | 8/2002 | Erten | ................... | G06K 9/6292 704/273 |

(Continued)

*Primary Examiner* — Paras D Shah
*Assistant Examiner* — Timothy Nguyen
(74) *Attorney, Agent, or Firm* — Finnegan, Henderson, Farrabow, Garrett & Dunner

(57) ABSTRACT

This disclosure relates generally to speech recognition, and more particularly to system and method for speech-to-text conversion using audio as well as video input. In one embodiment, a method is provided for performing speech to text conversion. The method comprises receiving an audio data and a video data of a user while the user is speaking, generating a first raw text based on the audio data via one or more audio-to-text conversion algorithms, generating a second raw text based on the video data via one or more video-to-text conversion algorithms, determining one or more errors by comparing the first raw text and the second raw text, and correcting the one or more errors by applying one or more rules. The one or more rules employ at least one of a domain specific word database, a context of conversation, and a prior communication history.

18 Claims, 3 Drawing Sheets

(56) References Cited

U.S. PATENT DOCUMENTS

| | | | | |
|---|---|---|---|---|
| 2002/0161582 | A1* | 10/2002 | Basson | G10L 21/06 |
| | | | | 704/260 |
| 2006/0009978 | A1* | 1/2006 | Ma | G10L 21/06 |
| | | | | 704/266 |
| 2010/0057455 | A1* | 3/2010 | Kim | G10L 13/08 |
| | | | | 704/235 |
| 2010/0085363 | A1* | 4/2010 | Smith | G06T 13/40 |
| | | | | 345/473 |
| 2010/0217593 | A1 | 8/2010 | Shields et al. | |
| 2011/0257971 | A1* | 10/2011 | Morrison | G06K 9/00221 |
| | | | | 704/233 |
| 2013/0332160 | A1* | 12/2013 | Posa | G06F 3/013 |
| | | | | 704/235 |
| 2013/0339025 | A1* | 12/2013 | Suhami | H04R 25/00 |
| | | | | 704/271 |
| 2014/0337023 | A1* | 11/2014 | McCulloch | G06F 1/163 |
| | | | | 704/235 |

\* cited by examiner

SYSTEM AND METHOD FOR SPEECH-TO-TEXT CONVERSION

TECHNICAL FIELD

This disclosure relates generally to speech recognition, and more particularly to system and method for speech-to-text conversion using audio as well as video input.

BACKGROUND

Speech-to-text conversion and text-to-speech conversion are two very commonly used techniques to improve man-machine interface with numerous real world applications. A lot of advancements have taken place to improve the accuracy of these techniques. However, despite all these advancements, when existing speech recognition (i.e., speech-to-text conversion) techniques are applied, the recording device (e.g., microphone) captures lots of background noise in the speech. This results in loss of words and/or misinterpretation of words, thereby causing overall decline in accuracy and reliability of speech recognition. Even the most sophisticated speech-to-text conversion algorithms are able to achieve accuracies only up to 80 percent.

This lack of accuracy and reliability of existing speech recognition techniques in turn hamper the reliability of the applications employing the speech recognition techniques. Such inaccuracy may also compromise the security of critical applications which may not be able to differentiate between false positives and false negatives, and hence may not be able to prevent a fraud. It is therefore desirable to provide an efficient technique that reduces errors and therefore improves accuracy of the speech-to-text conversions.

SUMMARY

In one embodiment, a method for performing speech to text conversion is disclosed. In one example, the method comprises receiving an audio data and a video data of a user while the user is speaking. The method further comprises generating a first raw text based on the audio data via one or more audio-to-text conversion algorithms. The method further comprises generating a second raw text based on the video data via one or more video-to-text conversion algorithms. The method further comprises determining one or more errors by comparing the first raw text and the second raw text. The method further comprises correcting the one or more errors by applying one or more rules. The one or more rules employ at least one of a domain specific word database, a context of conversation, and a prior communication history.

In one embodiment, a system for performing speech to text conversion is disclosed. In one example, the system comprises at least one processor and a memory communicatively coupled to at least one processor. The memory stores processor-executable instructions, which, on execution, cause the processor to receive an audio data and a video data of a user while the user is speaking. The processor-executable instructions, on execution, further cause the processor to generate a first raw text based on the audio data via one or more audio-to-text conversion algorithms. The processor-executable instructions, on execution, further cause the processor to generate a second raw text based on the video data via one or more video-to-text conversion algorithms. The processor-executable instructions, on execution, further cause the processor to determine one or more errors by comparing the first raw text and the second raw text. The processor-executable instructions, on execution, further cause the processor to correct the one or more errors by applying one or more rules. The one or more rules employ at least one of a domain specific word database, a context of conversation, and a prior communication history.

In one embodiment, a non-transitory computer-readable medium storing computer-executable instructions for performing speech to text conversion is disclosed. In one example, the stored instructions, when executed by a processor, cause the processor to perform operations comprising receiving an audio data and a video data of a user while the user is speaking. The operations further comprise generating a first raw text based on the audio data via one or more audio-to-text conversion algorithms. The operations further comprise generating a second raw text based on the video data via one or more video-to-text conversion algorithms. The operations further comprise determining one or more errors by comparing the first raw text and the second raw text. The operations further comprise correcting the one or more errors by applying one or more rules. The one or more rules employ at least one of a domain specific word database, a context of conversation, and a prior communication history.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Human speech in any language is made up of numerous different sounds and syllables that combine to form words and/or sentences. Thus, the spoken word in any language can be broken down in to a set of fundamental sounds called phonemes. For example, there are 44 speech sounds or phonemes in English language. Thus, one may identify speech patterns from the phonemes.

Further, there are unique ways of uttering different phonemes. For example, for uttering 'O', person has to open his/her mouth and the pattern it makes is circle/oval shape. Similarly, for uttering 'E', person has to open his/her mouth in horizontal oval shape; upper teeth and lower teeth closer to each other. Thus, one may identify speech patterns from the movement of the mouth region. The movement of the mouth region captured by the imaging device gets converted in to visemes. As will be appreciated by those skilled in the art, a viseme is a generic facial image that can be used to describe a particular sound. Thus, a viseme is a visual equivalent of a phoneme or unit of sound in spoken language. It should be noted that visemes and phonemes do not share a one-to-one correspondence. Often several phonemes may correspond to a single viseme as several phonemes look the same on the face when produced, thereby making the decoded words potentially erroneous.

In speech to text conversion, speech sound is generated as the first step and mapped on to text strings. One may narrow down the possibility of the word being spoken by integrating the speech pattern from the video data and the speech pattern from the audio data, thereby reducing the word error rate. The 44 phonemes in English language fit in to a fixed number of viseme bins each of which has similar movement of the mouth region. Each viseme bin therefore has 1 or more elements (e.g., a, k etc, have similar lip movements). In some embodiments of the present disclosure, 12 visemes (11+silence) are considered.

Figure 1:
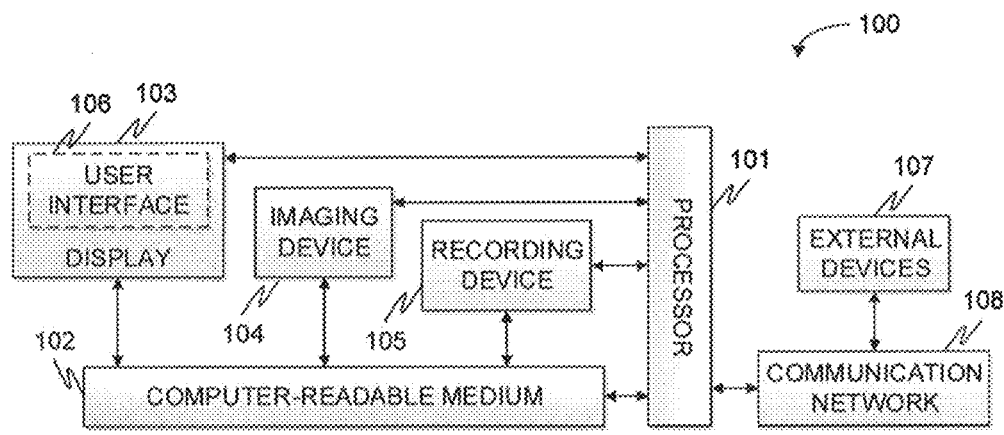
FIG. 1 is a block diagram of an exemplary system for performing speech-to-text conversion in accordance with some embodiments of the present disclosure.

Referring now to FIG. 1, an exemplary system 100 for performing speech-to-text conversion is illustrated in accordance with some embodiments of the present disclosure. In particular, the system 100 implements a speech-to-text conversion engine for performing speech-to-text conversion. As will be described in greater detail in conjunction with FIG. 2, the speech-to-text conversion engine performs speech-to-text conversion using audio as well as video input in conjunction with one or more rules employing at least one of a domain specific word database, a context of conversation, and a prior communication history. The system 100 comprises one or more processors 101, a computer-readable medium (e.g., a memory) 102, a display 103, an imaging device 104, and a recording device 105. The system 100 interacts with users via a user interface 106 accessible to the users via the display 103. The system 100 may also interact with one or more external devices 107 over a communication network 108 for sending or receiving data. The external devices 107 may include, but are not limited to, remote servers, computers, mobile devices, another systems or devices located locally or remotely with respect to the system 100. The communication network 108 may be any wired or wireless communication network.

The imaging device 104 may include a digital camera or a video recorder for capturing a video data of a user while the user is speaking. In some embodiments, the imaging device 104 captures a movement of a mouth region of the user while the user is speaking. The mouth region may include one or more articulators (e.g., a lip, a tongue, teeth, a palate, etc.), facial muscles, vocal cords, and so forth. The recording device 105 may include a microphone for capturing an audio data of the user while the user is speaking. In some embodiments, the recording device 105 is a high fidelity microphone to capture the speech waveform of the user with a minimum signal to noise ratio (i.e., minimum background noise).

The computer-readable medium 102 stores instructions that, when executed by the one or more processors 101, cause the one or more processors 101 to perform speech-to-text conversion in accordance with aspects of the present disclosure. The computer-readable storage medium 102 may also store the video data captured by the imaging device 104, the audio data captured by the recording device 105, and other data as required or as processed by the system 100. The other data may include a generic phonemes (i.e., fundamental sounds) database, a generic visemes (i.e., similar movement of mouth region covering all phonemes) database, a phonemes database customized with respect to a user during a training phase, a visemes database customized with respect to a user during a training phase, a generic word database, a domain specific word database, a context database, a prior conversation history database, one or more mathematical models (e.g., a language model, acoustic model, a model trainer, Hidden Markov Model, etc.), various model parameters, various rules, and so forth. The one or more processors 101 perform data processing functions such as audio-to-text processing, video-to-text processing, image or video processing, comparing raw texts generated by audio-to-text processing and video-to-text processing, determining errors based on comparison, correcting errors by applying one or more rules, and so forth.

Figure 2:
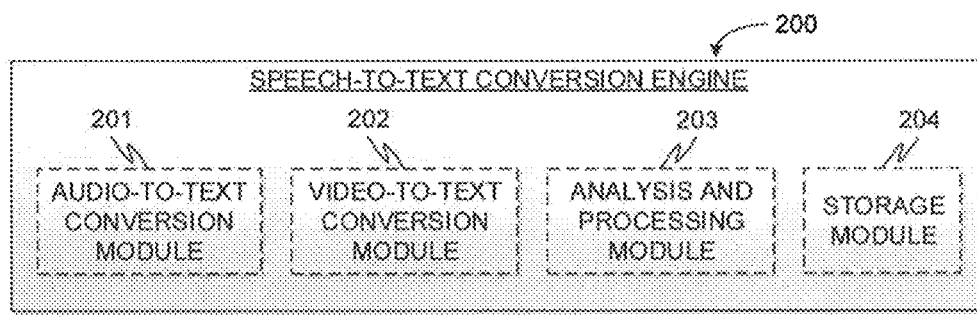
FIG. 2 is a functional block diagram of a speech-to-text conversion engine in accordance with some embodiments of the present disclosure.

Referring now to FIG. 2, a functional block diagram of the speech-to-text conversion engine 200 implemented by the system 100 of FIG. 1 is illustrated in accordance with some embodiments of the present disclosure. In some embodiments, the speech-to-text conversion engine 200 comprises an audio-to-text conversion module 201, a video-to-text conversion module 202, an analysis and processing module 203, and a storage module 204. As will be appreciated by those skilled in the art, each of the modules 201-204 may reside, in whole or in parts, on the system 100 and/or the external devices 107.

The audio-to-text conversion module 201 receives the audio data from the recording device and generates a first raw text based on the audio data via one or more audio-to-text conversion algorithms. In some embodiment, the audio-to-text conversion module 201 extracts a sequence of phonemes from the received audio data and then maps the sequence of phonemes to a corresponding text using a phoneme-to-text database and a word database. Similarly, the video-to-text conversion module 202 receives the video data from the imaging device and generates a second raw text based on the video data via one or more video-to-text conversion algorithms. In some embodiment, the video-to-text conversion module 202 extracts a sequence of visemes from the video data and then maps the sequence of visemes to a corresponding text using a viseme-to-text database and a word database. It should be noted that the extracted visemes maps uniquely to the movement of the mouth region. In some embodiments, the word database employed by the audio-to-text conversion module 201 or the video-to-text conversion module 202 may be a domain specific word database based on a context of the speech or a prior conversation history involving the user. For example, the word database employed by the audio-to-text conversion module 201 may be a generic word database while the word database employed by the video-to-text conversion module 202 may be a domain specific word database. The audio-to-text conversion module 201 or the video-to-text conversion module 202 may determine the context of the speech by referring to a context database or may determine the prior conversation history involving the user by referring to a prior conversation history database.

Further, in some embodiments, the audio-to-text conversion module 201 and the video-to-text conversion module 202 may employ various mathematical models to perform speech-to-text conversion and video-to-text conversion respectively. For example, the audio-to-text conversion module 201 may employ the language model, the acoustic model, and the model trainer in conjunction with the Hidden Markov Model (HMM) that constitute part of a typical speech to text converter so as to map fragments of the audio data to phonemes. As discussed above, the sequence of phonemes constitutes a word. Similarly, the video-to-text conversion module 202 may employ optical flow model (e.g., KLT transform) in conjunction with the HMM so as to map fragments of the video data to visemes.

In some embodiments, a customized phoneme-to-text database comprising of customized phonemes pattern may be created for every user once during a training phase (i.e., before actual usage) by prompting the user to speak pre-defined sentences covering all the phonemes for a given language (e.g., 44 phonemes in English language). Simultaneously, the movement of the mouth region may be recorded so as to extract the visemes and to associate the visemes with the phonemes. A customized visemes-to-text database comprising of customized visemes pattern may then be created for the same user. It should be noted that different visemes may be standardized while mapping the facial expression change for various phonemes on to the phonemes. In other words, different visemes may be normalized with respect to a neutral face. As will be appreciated by those skilled in the art, the customized phonemes database enables the audio-to-text conversion module 201 to handle any accent variations among different users while speaking. Similarly, the customized visemes database enables the video-to-text conversion module 202 to handle any facial expression variations among different users while speaking.

The analysis and processing module 203 determines one or more errors by comparing the first raw text from the audio-to-text conversion module 201 and the second raw text from the video-to-text conversion module 202. In particular, the analysis and processing module 203 compare a sequence of phonemes in the first raw text with a corresponding sequence of visemes in the second raw text for one or more mismatches. The comparison is carried out by a rules engine. In some embodiments, the rule engine may exploiting lateral information in the sequence of phonemes and the corresponding sequence of visemes to perform the comparison. The comparison between the two paths (the audio-to-text and the video-to-text components of the speech) may be performed in either phonemes or visemes domain. In some embodiments, the audio-to-text data may be used as a base line for the possible words while the video-to-text data may be used for error determination. A word is correctly converted when the video-to-text conversion of a video of an utterance of the word matches with the audio-to-text conversion of the utterance of the word.

The analysis and processing module 203 further corrects the one or more errors (i.e., one or more wrongly converted words) determined by it. As many phonemes may map to same viseme, it is important to pick the right phoneme corresponding to the viseme in the visceral bin for correcting the errors. This is achieved by developing one or more rules and applying these rules via a rule engine. It should be noted that the rules are created once and used over every mismatch between phonemes and visemes. Further, natural language processing (NLP) or high likelihood techniques may be employed to resolve the tie between two phonemes corresponding to same viseme. Likelihoods may be determined by weighing, training, fuzzy logic, or filters applied over audio samples. The rule engine is scalable and new rules may be added dynamically in a rules database of the rule engine. In some embodiments, the rules may be added manually during the training phase or during deployment phase (i.e., during actual usage). Alternatively, the rules may be generated and added automatically based on the intelligence gathered by the analysis and processing module 203 during manual correction of the errors. In some embodiments, the rules are independent of language.

The one more rules employ at least one of a domain specific word database, a context of conversation, and a prior conversation history. Thus, the rule engine works as long as appropriate domain specific word database and generic word database of any given language are made available. Further, in some embodiments, the rule engine also requires the context database and the prior conversation history database. In some embodiments, the one or more rules may be applied in a pre-defined order. For example, in some embodiments, the following rules are considered and may be triggered from simple to complex (i.e. from R1 to R5):

| Rule | If (scenario) | Then (do this or these steps) |
|---|---|---|
| R1 | Defined viseme bin has a single element with oral (audio) and visual (video) mismatch. | Directly replace it in wrong phonetic point in speech-to-text output.<br>For example, the user utterance "I studied up to ME" may be wrongly translated to "I studied up to BE". BE is also a valid course but not the one uttered by the user. Video-to-text based on the movement of the mouth region may correctly give correct course as ME. |
| R2 | Viseme bin has single element with 2 or more phonemes per letter; oral and visual mismatch, | Computation required; correction is to be based on probability models, appropriateness, or close match for error phonetic. |
| R3 | Viseme bin has more than 1 elements; historical data (i.e., previous utterances of the speaker) not available. | Use domain specific word database stored along with the generic word databases.<br>For example, the user utterance "the flower is called May flower" may be wrongly translated to "the flower is called Bay flower". Visual input says 'pay flower' or 'may flower' as the phonetics/pe and/me fall in to same viseme. Now, consult word databases to resolve the mapping tie. May flower is a valid word in the word databases. The corrected word is now 'May flower'. |
| R4 | Viseme bin has | Similar to case 3. Search the word to be corrected from |

| Rule | If (scenario) | Then (do this or these steps) |
|---|---|---|
| | more than 1 elements; historical data available (previous dialog stored). | previous utterances that is likely uttered correctly. |
| R5 | Viseme bin has more than 1 elements; R1 to R4 failed. | Ask clarification question(s). For example, the user utters "The chemical is called potassium cyanate". Audio Speech to text converter gives Cyanide. The phonemes/ate and/ide map to same viseme. Now, consult domain specific word database. Both cyanate and cyanide are valid. Confusion still prevails. No historical data available. So, put a clarification question to the user. |

The analysis and processing module 203 further generates a final text based on the first raw text from the audio-to-text conversion module 201 and the correction. Thus, the errors in the first raw text are identified and corrected so as to generate the final text. Alternatively, the analysis and processing module 203 may generate a final text based on the second raw text from the video-to-text conversion module 202 and the correction. The storage module 204 stores various data (e.g., audio data, video data, phonemes, visemes, databases, mathematical models, rules, etc.) as required or as processed by the speech-to-text conversion engine 200. In particular, the storage module 204 includes various database (e.g., phonemes-to-text database, visemes-to-text database, word database, context database, prior conversation history database, rules database, etc.) built by or called by different modules 201-203. Thus, the modules 201-203 stores, queries, recall the data via the storage module 204.

As will be appreciated by one skilled in the art, a variety of processes may be employed for performing speech to text conversion. For example, the exemplary system 100 may perform speech to text conversion by the processes discussed herein. In particular, as will be appreciated by those of ordinary skill in the art, control logic and/or automated routines for performing the techniques and steps described herein may be implemented by the system 100, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 3:
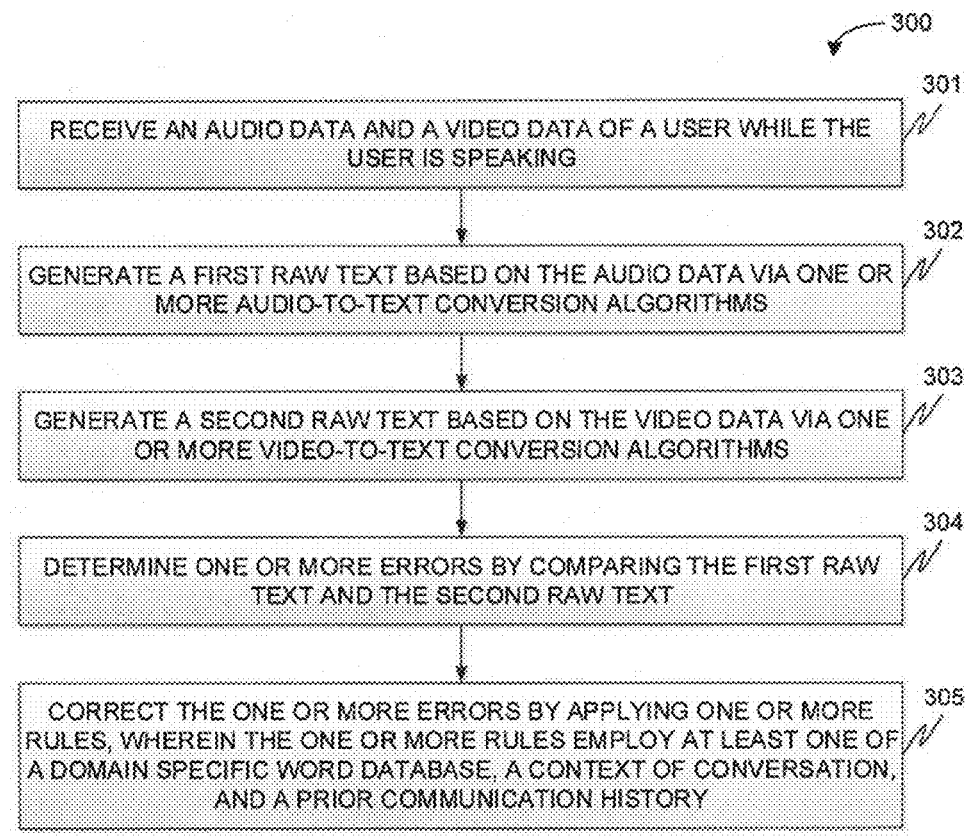
FIG. 3 is a flow diagram of an exemplary process for performing speech-to-text conversion in accordance with some embodiments of the present disclosure.

For example, referring now to FIG. 3, exemplary control logic 300 for performing speech to text conversion via a system, such as system 100, is depicted via a flowchart in accordance with some embodiments of the present disclosure. As illustrated in the flowchart, the control logic 300 includes the steps of receiving an audio data and a video data of a user while the user is speaking at step 301, generating a first raw text based on the audio data via one or more audio-to-text conversion algorithms at step 302, generating a second raw text based on the video data via one or more video-to-text conversion algorithms at step 303, determining one or more errors by comparing the first raw text and the second raw text at step 304, and correcting the one or more errors by applying one or more rules at step 305. The one or more rules employ at least one of a domain specific word database, a context of conversation, and a prior communication history. In some embodiments, the control logic 300 may further include the step of generating a final text based on the first raw text or the second raw text, and the correction.

In some embodiments, receiving the video data at step 301 comprises receiving a movement of a mouth region of the user while the user is speaking. It should be noted that the movement of the mouth region comprises at least one of a movement of one or more articulators, a movement of facial muscles, and a movement of vocal cords. Additionally, in some embodiments, generating the first raw text at step 302 comprises extracting a sequence of phonemes from the audio data, and mapping the sequence of phonemes to a corresponding text using a phoneme-to-text database and a word database. Similarly, in some embodiments, generating the second raw text at step 303 comprises extracting a sequence of visemes from the video data, and mapping the sequence of visemes to a corresponding text using a viseme-to-text database and a domain specific word database. In some embodiments, the phoneme-to-text database or the viseme-to-text database is customized for the user during a training phase. Further, in some embodiments, determining the one or more errors at step 304 comprises comparing a sequence of phonemes in the first raw text with a corresponding sequence of visemes in the second raw text for one or more mismatches. Moreover, in some embodiments, correcting the one or more errors at step 305 comprises applying the one or more rules in a pre-defined order.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 4:
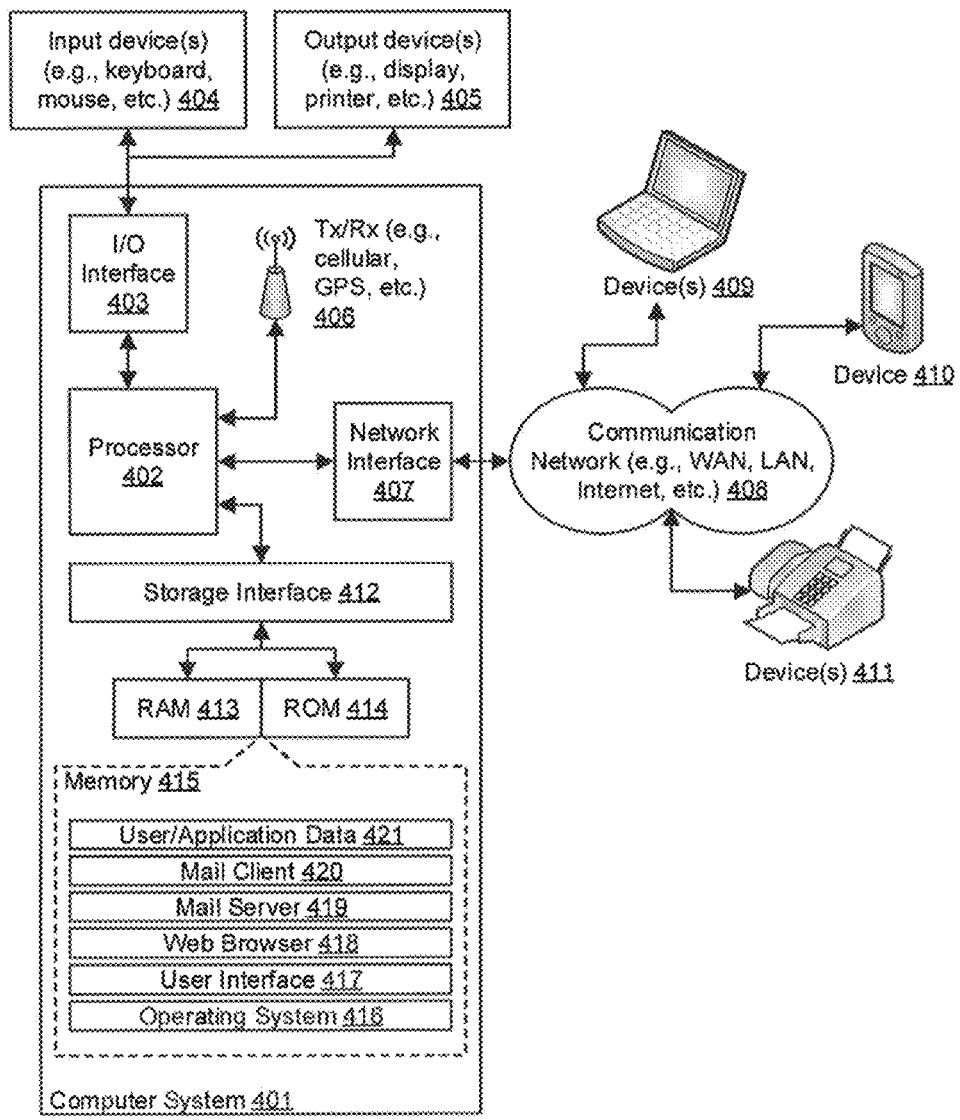
FIG. 4 is a block diagram of an exemplary computer system for implementing embodiments consistent with the present disclosure.

Referring now to FIG. 4, a block diagram of an exemplary computer system 401 for implementing embodiments consistent with the present disclosure is illustrated. Variations of computer system 401 may be used for implementing system 100 for performing speech to text conversion. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilia Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like.

The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. (e.g., video data, audio data, phonemes database, visemes database, word database, context database, mathematical models, model parameters, word or text error, rules database, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above enables correction of error in a text obtained via speech-to-text conversion using visemes. It should be noted that the correction of errors in the text is performed at the level of a phoneme. The techniques enable correction of errors originating due to low signal-to-noise ratio, background noise, and accent variation. The correction of error is performed automatically using a rule based model without any human intervention, thereby increasing efficiency and accuracy of speech to text conversion. The accuracy of conversion remains same independent of background noise and signal-to-noise ratio (i.e., voice strength), Further, the techniques described in the various embodiments discussed above require information from both the channels (audio and video) for performing error correction.

The techniques described in the various embodiments discussed above may be extended to support speech-to-text conversion in any language. The techniques take very less time for training and can therefore be quickly deployed (i.e., put to real-life use), The techniques may be employed in all voice based dialog systems (e.g., Interactive voice response systems, voice command systems, voice based automation systems, voice based interface systems, etc.) of a roan-machine interface. The speech-to-text conversion engine described in the various embodiments discussed above may be employed as a standalone module in the voice based dialog systems or as a part of speech-to-text conversion module in the voice based dialog systems.

The specification has described system and method for performing speech to text conversion. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for performing speech to text conversion, the method comprising:
   receiving, via a processor, an audio data and a video data of a user while the user is speaking;
   generating, via the processor, a first raw text based on the audio data using a language model and an acoustic model in conjunction with a Hidden Markov Model;
   generating, via the processor, a second raw text based on the video data using Karhunen-Loeve Transform (KLT) in conjunction with the Hidden Markov Model;
   determining, via the processor, a plurality of errors by comparing the first raw text and the second raw text, wherein determining the one or more errors comprises comparing a sequence of phonemes in the first raw text with a corresponding sequence of visemes in the second raw text for one or more mismatches;
   correcting, via the processor, the plurality of errors by applying one or more rules, wherein the one or more rules employ at least one of a domain specific word database, a context of conversation, and a prior communication history;
   generating a correction to an error of the plurality of errors;
   automatically generating a rule based on the error, the correction and training; and
   applying the one or more rules to another error of the plurality of errors to obtain a final text.

2. The method of claim 1, wherein receiving the video data comprises receiving a movement of a mouth region of the user while the user is speaking, wherein the movement of the mouth region comprises at least one of a movement of one or more articulators, a movement of facial muscles, and a movement of vocal cords.

3. The method of claim 1, wherein generating the first raw text comprises: extracting a sequence of phonemes from the audio data; and mapping the sequence of phonemes to a corresponding text using a phoneme-to-text database and a word database.

4. The method of claim 3, wherein the phoneme-to-text database is customized for the user during a training phase.

5. The method of claim 1, wherein generating the second raw text comprises: extracting a sequence of visemes from the video data; and mapping the sequence of visemes to a corresponding text using a viseme-to-text database and a domain specific word database.

6. The method of claim 5, wherein the viseme-to-text database is customized for the user during a training phase.

7. The method of claim 1, wherein correcting the one or more errors comprises applying the one or more rules in a pre-defined order.

8. The method of claim 1, further comprising generating a final text based on the first raw text or the second raw text, and the correction.

9. A system for performing speech to text conversion, the system comprising: at least one processor; and
a computer-readable medium storing instructions that, when executed by the at least one processor, cause the at least one processor to perform operations comprising:
receiving an audio data and a video data of a user while the user is speaking;
generating a first raw text based on the audio data using a language model and an acoustic model in conjunction with a Hidden Markov Model;
generating a second raw text based on the video data using Karhunen-Loeve Transform (KLT) in conjunction with the Hidden Markov Model;
determining a plurality of errors by comparing the first raw text and the second raw text, wherein determining the plurality of errors comprises comparing a sequence of phonemes in the first raw text with a corresponding sequence of visemes in the second raw text for one or more mismatches;
correcting the plurality of errors by applying one or more rules, wherein the one or more rules employ at least one of a domain specific word database, a context of conversation, and a prior communication history;
generating a correction to an error of the plurality of errors;
automatically generating a rule based on the error, the correction and training; and
applying the one or more rules to another error of the plurality of errors to obtain a final text.

10. The system of claim 9, wherein receiving the video data comprises receiving a movement of a mouth region of the user while the user is speaking, wherein the movement of the mouth region comprises at least one of a movement of one or more articulators, a movement of facial muscles, and a movement of vocal cords.

11. The system of claim 9, wherein generating the first raw text comprises:
extracting a sequence of phonemes from the audio data; and
mapping the sequence of phonemes to a corresponding text using a phoneme to-text database and a word database.

12. The system of claim 11, wherein the phoneme-to-text database is customized for the user during a training phase.

13. The system of claim 9, wherein generating the second raw text comprises:
extracting a sequence of visemes from the video data; and
mapping the sequence of visemes to a corresponding text using a viseme-to-text database and a domain specific word database.

14. The system of claim 13, wherein the viseme-to-text database is customized for the user during a training phase.

15. The system of claim 9, wherein correcting the one or more errors comprises applying the one or more rules in a pre-defined order.

16. The system of claim 9, wherein the operations further comprise
generating a final text based on the first raw text or the second raw text, and the correction.

17. A non-transitory computer-readable medium storing computer-executable instructions for:
receiving an audio data and a video data of a user while the user is speaking;
generating a first raw text based on the audio data using a language model and an acoustic model in conjunction with a Hidden Markov Model;
generating a second raw text based on the video data using Karhunen-Loeve Transform (KLT) in conjunction with the Hidden Markov Model;
determining a plurality of errors by comparing the first raw text and the second raw text, wherein determining the plurality of errors comprises comparing a sequence of phonemes in the first raw text with a corresponding sequence;
of visemes in the second raw text for one or more mismatches; correcting the plurality of errors by applying one or more rules,
wherein the one or more rules employ at least one of a domain specific word database,
a context of conversation, and a prior communication history;
generating a correction to an error of the plurality of errors;
automatically generating a rule based on the error, the correction and training; and
applying the one or more rules to another error of the plurality of errors to obtain a final text.

18. The non-transitory computer-readable medium of claim 17, wherein correcting the one or more errors comprises applying the one or more rules in a pre-defined order.

* * * * *